United States Patent [19]
Jones et al.

[11] Patent Number: 5,844,385
[45] Date of Patent: Dec. 1, 1998

[54] ABSOLUTE ANGLE ESTIMATION APPARATUS FOR A SENSORLESS SWITCHED RELUCTANCE MACHINE SYSTEM

[75] Inventors: Stephen R. Jones, Winnebago; Barry T. Drager, Rockford, both of Ill.

[73] Assignee: Sundstrand Corporation, Rockford, Ill.

[21] Appl. No.: 680,581

[22] Filed: Jul. 10, 1996

[51] Int. Cl.$^6$ .................................................. H02K 23/00
[52] U.S. Cl. ......................... 318/254; 318/439; 318/701
[58] Field of Search .................................... 318/696, 685, 318/439, 138, 700, 701, 705–715, 716, 717, 720, 721

[56] References Cited

U.S. PATENT DOCUMENTS

| | | | |
|---|---|---|---|
| 4,331,924 | 5/1982 | Elliott et al. | 377/47 |
| 4,374,351 | 2/1983 | Fishman et al. | 318/600 |
| 4,455,513 | 6/1984 | Fulton et al. | 318/138 |
| 4,553,078 | 11/1985 | Wise | 318/594 |
| 4,611,157 | 9/1986 | Miller et al. | 318/696 |
| 4,642,543 | 2/1987 | MacMinn | 318/696 |
| 4,772,839 | 9/1988 | MacMinn et al. | 318/696 |
| 4,825,055 | 4/1989 | Pollock | 235/411 |
| 4,959,596 | 9/1990 | MacMinn et al. | 318/254 |
| 4,959,823 | 9/1990 | Getreuer et al. | 369/44.13 |
| 5,097,190 | 3/1992 | Lyons et al. | 318/701 |
| 5,105,137 | 4/1992 | Iijima | 318/568 |
| 5,107,195 | 4/1992 | Lyons et al. | 318/701 |
| 5,115,180 | 5/1992 | Chung | 318/618 |
| 5,140,243 | 8/1992 | Lyons et al. | 318/701 |
| 5,140,244 | 8/1992 | Lyons et al. | 318/701 |
| 5,144,564 | 9/1992 | Naidu et al. | 318/721 X |
| 5,159,254 | 10/1992 | Teshima | 318/611 |
| 5,173,650 | 12/1992 | Heglund | 318/701 |
| 5,196,775 | 3/1993 | Harris et al. | 318/799 X |
| 5,248,921 | 9/1993 | Kato et al. | 318/560 |
| 5,291,115 | 3/1994 | Ehsani | 318/701 |
| 5,296,785 | 3/1994 | Miller | 318/254 |
| 5,325,026 | 6/1994 | Lyons et al. | 318/254 |
| 5,332,955 | 7/1994 | Hopper | 318/632 |
| 5,381,081 | 1/1995 | Radun | 318/701 |
| 5,394,323 | 2/1995 | Yellowley et al. | 364/167 |
| 5,404,091 | 4/1995 | Radun et al. | 318/701 |
| 5,448,149 | 9/1995 | Ehsani et al. | 318/701 |
| 5,467,025 | 11/1995 | Ray | 324/772 |
| 5,488,531 | 1/1996 | Aldridge et al. | 363/56 |
| 5,491,622 | 2/1996 | Carosa | 363/56 |
| 5,493,195 | 2/1996 | Heglund et al. | 318/701 |
| 5,499,186 | 3/1996 | Carosa | 363/56 |
| 5,525,886 | 6/1996 | Lyons et al. | 318/701 |
| 5,627,444 | 5/1997 | Fulks | 318/701 |
| 5,637,974 | 6/1997 | McCann | 318/701 |

FOREIGN PATENT DOCUMENTS

| | | |
|---|---|---|
| 276625 | 8/1988 | European Pat. Off. . |
| 401818 | 12/1990 | European Pat. Off. . |
| WO 94 11945 | 5/1994 | WIPO . |
| WO 97 38484 | 10/1997 | WIPO . |

OTHER PUBLICATIONS

Reynolds et al, "Robust Estimation of Covariance Matrices", IEEE Transactions on Automatic Control, Sep. 9, 1990.

N.M. Mvungi et al., "Sensorless Rotor Position in an SR Motor", European Conference on Power Electronics and Application, Sep. 3–6, 1991.

Ertugrul et al., "Real–Time Estimation of Rotor Position in PM Motors During Transient Operation", The European Power Electronics Association, 1993.

(List continued on next page.)

*Primary Examiner*—Brian Sircus
*Attorney, Agent, or Firm*—Marshall, O'Toole, Gerstein, Murray & Borun

[57] ABSTRACT

An apparatus for estimating rotor position of a rotating machine having an even number of phase windings selects first and second phase position estimates developed in response to pulses applied to phase windings having associated phase profiles that are displaced at other than 180 electrical degrees and determines a rotor position estimate from the first and second phase position estimates.

11 Claims, 8 Drawing Sheets

OTHER PUBLICATIONS

Jones et al., "Performance of a High Speed Switched Reluctance Starter/Generator System Using Electronic Position Sensing", Record of the Industry Applications Conference, Oct. 8–12, 1995.

Ramoni et al., "New Communication Methods in Switched Reluctance Motors Based on Active Phase Vectors", Proceedings of the Annual Power Electronics Specialists Conference, Jun. 20–24, 1994.

Panda et al., "Further Developments in Indirect–Rotor Position Sensing of Variable–Reluctance Motors Using Wave Form Detection Technique", Power Electronics, Nov. 15–19, 1993.

Bado et al., "Effective Estimation of Speed and Rotor Position of a PM Synchronous Motor Drive by a Kalman Filtering Technique", Proceedings of the Annual Power Electronics Specialists Conference, Jun. 29–Jul. 3, 1992.

*Design and Implementation of a Five Horsepower, Switched Reluctance, Fuel–Lube, Pump Motor Drive for a Gas Turbine Engine* written by Caio A. Ferreira, Stephen R. Jones, Barry T. Drager and William S. Heglund, IEEE Ninth Annual Applied Power Electronics Conference and Exposition, Feb. 13–17, 1994.

*Practical Indirect Position Sensing for a Variable Reluctance Motor* written by Walter D. Harris and submitted to the Massachusetts Institute of Technology, May 1987.

*A Simple Motion Estimator for Variable–Reluctance Motors,* written by Walter D. Harris and Jeffrey H. Lang, published in IEEE, vol. 26, No. 2. Mar./Apr. 1990.

*Low Cost Sensorless Switched Reluctance Motor Drives For Automotive Applications* written by M. Ehsnai and I. Husain, (members IEEE) Power Electronics Laboratory, Dept. Of Electrical Engineering, Texas A&M University, College Station, TX. pp. 96–101 1990.

*Application of Sensor Integration Techniques to Switched Reluctance Motor Drives* written by Stephen R. MacMinn, William J. Rzesos, Paul M. Szczesny and Thomas M. Jahns, published in IEEE vol. 28, No. 6, Nov./Dec. 1992.

*An Analysis of the Error in Indirect Rotor Position Sensing of Switched Reluctance Motors,* written by M. Ehsani, I. Husain and K.R. Ramani, Department of Electrical Engineering, Texas A&M University, College Station, Texas 1991.

*A Comparative Analysis of SRM Discrete Shaft Position Sensor Elimination by FM Encoder and Pulsed Impedance Sensing Schemes,* written by M Ehsani, Dept. Of Electrical Engineering, Texas A&M University, College Station, Texas 1991.

*New Modulation Encoding Techniques for Indirect Rotor Position Sensing in Switched Reluctance Motors,* writen by Mehrdad Ehsani, Iqbal Husain, S. Mahajan, and K.R. Ramani, published in IEEE, vol. 30, No. 1, Jan./Feb. 1994.

*Flux/Current Methods for SRM Rotor Position Estimation,* written by J.P. Lyons, S.R. MacMinn and M.A. Preston, published in May 1991 IEEE.

ABSOLUTE ANGLE ESTIMATION APPARATUS FOR A SENSORLESS SWITCHED RELUCTANCE MACHINE SYSTEM

BACKGROUND AND SUMMARY OF THE INVENTION

The present invention relates generally to motors/generators, and more particularly, to high speed switched reluctance machines capable of starting a prime mover as well as generating electrical power for use on aircraft.

The aerospace industry has consistently driven the leading edge of technology with the requirement for lightweight, high efficiency, high reliability equipment. The equipment must be lightweight because each additional pound of weight translates directly into increased fuel burn, and therefore, a higher cost of ownership and shorter range. The need for high efficiency results from the fact that each additional cubic inch required for equipment displaces the amount of revenue-generating cargo and passengers that can be carried on an aircraft. High reliability is important because every minute of delay at the gate increases the cost of ownership, and likewise, increases passenger frustration.

Aircraft have typically used synchronous brushless AC generators or permanent magnet generators for electric power generation needs.

In addition to an electrical generator, an engine starter is also typically installed on the aircraft engine. This component is used only during starting, which occupies only a very small fraction of each operational cycle of the aircraft. In effect, the starter becomes excess baggage during the remainder of the flight, increasing overall weight, fuel burn, and cost of ownership, and decreasing overall range. This problem has been recognized and efforts have been expended to combine the starter and generator into a single package, thus eliminating the need for an additional piece of equipment used only a fraction of the time.

As an alternative to the use of the synchronous AC or the permanent magnet generator for this combined starter/generator function, a switched reluctance machine can be used. A switched reluctance machine is an inherently low cost machine, having a simple construction which is capable of very high speed operation, thus yielding a more lightweight design. The rotor of the switched reluctance machine is constructed from a simple stack of laminations making it very rugged and low cost without the containment problems associated with rotor windings or permanent magnets. Further, the rotor does not require rotating rectifiers, which contribute to failures, as found in the AC synchronous machine.

In order to properly operate a switched reluctance machine, it is necessary to determine the rotor position in order to properly commutate the currents flowing in the phase windings of the machine. Resolvers are used, particularly in high speed systems, or sometimes encoders in lower speed systems, to obtain a measure of rotor position. However, resolvers and required associated apparatus (chiefly, a resolver-to-digital converter and an excitation circuit) are expensive and both resolvers and encoders are a source of single point failure.

In order to obviate the need for position sensors, such as resolvers or encoders, sensorless operational techniques have been developed. The most trivial solution to sensorless operation is to control the switched reluctance machine as a stepper motor in the fashion disclosed in Bass, et al. U.S. Pat. No. 4,611,157 and MacMinn U.S. Pat. No. 4,642,543.

In an alternative technique, machine inductance or reluctance is detected and utilized to estimate rotor position. Specifically, because the phase inductance of a switched reluctance machine varies as a function of angle from alignment of the stator pole for that phase and a rotor pole, a measurement of instantaneous phase inductance can be utilized to derive an estimate of rotor position. See MacMinn, et al. U.S. Pat. No. 4,772,839, MacMinn, et al. U.S. Pat. No. 4,959,596, Harris "Practical Indirect Position Sensing for a Variable Reluctance Motor," Masters of Science Thesis, MIT, May 1987, Harris, et al. "A Simple Motion Estimator for Variable Reluctance Motors," IEEE Transactions on Industrial Applications, Vol. 26, No. 2, March/April, 1990, and MacMinn, et al. "Application of Sensor Integration Techniques to Switched Reluctance Motor Drives," IEEE Transactions on Industry Applications, Vol. 28, No. 6, November/December, 1992.

More particularly, the phase inductance L, for a given phase current $I_{phase}$ and a given flux linkage $\Psi$, is defined as:

$$L = \Psi / I_{phase} \qquad (1)$$

wherein the flux linkage for the particular phase can be calculated for a given phase voltage $V_{phase}$ and a given phase resistance $R_{phase}$ as follows:

$$\Psi = \int (V_{phase} - I_{phase} R_{phase}) dt + C \qquad (2)$$

Previous techniques for sensorless determination of rotor position have actually measured phase voltage and current magnitudes. However, measurement of the phase voltage magnitude results in the need for additional sensors and conductors between the inverter and the controller, thereby introducing additional costs and potential for failures.

In a further technique, phase inductance can be determined using a frequency modulation approach whereby a non-torque producing phase forms part of a frequency modulation encoder. See Ehsani, et al. "Low Cost Sensorless Switched Reluctance Motor Drives for Automotive Applications," Texas A&M Power Electronics Laboratory Report (date unknown), Ehsani, et al. "An Analysis of the Error in Indirect Rotor Position Sensing of Switched Reluctance Motors," IEEE Proceedings IECON '91, Ehsani "A Comparative Analysis of SRM Discrete Shaft Position Sensor Elimination by FM Encoder and Pulsed Impedance Sensing Schemes," Texas A&M Power Electronics Laboratory Report, (date unknown) and Ehsani, et al. "New Modulation Encoding Techniques for Indirect Rotor Position Sensing in Switched Reluctance Motors," IEEE Transactions on Industry Applications, Vol. 30, No. 1, January/February, 1994.

A model-based approach to rotor position estimation has been developed by General Electric Company and is disclosed in Lyons, et al. "Flux/Current Methods for SRM Rotor Position Estimation," Proceedings of IEEE Industry Applications Society Annual Meeting, Vol. 1, 1991, and Lyons, et al. U.S. Pat. No. 5,097,190. In this technique, a multi-phase lumped parameter model of the switched reluctance machine is developed and utilized.

A position estimation subsystem has been developed by the assignee of the instant application and includes a relative angle estimation circuit, an angle combination circuit and an estimator in the form of a Kalman filter. The relative angle estimation circuit is responsive to the phase currents and voltages of the switched reluctance machine and develops an angle estimate for each phase. The angle combination circuit combines the phase angle estimates to obtain an absolute angle estimate which eliminates ambiguities that would otherwise be present. The Kalman filter utilizes a model of the switched reluctance machine system as well as the absolute angle measurement to form a better estimate of the rotor position and velocity and, if necessary or desirable for other purposes, the rotor acceleration.

During start up of the switched reluctance machine, sensing pulses are applied to the phase windings of the machine in order to permit the machine and the associated control to be initialized. In those cases where the machine has an even number of phases and during the time that the sensing pulses are in use, an ambiguity in addition to those noted above can arise in the development of the absolute angle estimate. Specifically, if phase angle estimates from phases having a certain phase relationship are used, there are two possible solutions in the estimation of the absolute angle, only one of which is correct.

It is an object of the present invention to provide an apparatus for developing an estimate of rotor position of a rotating machine having an even number of phase windings wherein the estimate is free of ambiguities.

It is further an object of the present invention to provide a control for a sensorless switched reluctance machine having an even number of phases which is effective to develop an absolute angle estimate free from the above-noted ambiguity.

It is yet another object of the present invention to provide relative angle estimation apparatus for a sensorless switched reluctance machine system that is capable of developing an absolute angle estimate free of ambiguities even during the time that sensing pulses are in use.

It is a still further object of the present invention to develop an absolute angle estimate for a switched reluctance machine which is free of ambiguities using an apparatus which is simple, inexpensive and reliable.

These and other objects and advantages are attained by the provision of an apparatus that develops an absolute angle estimate during the time that sensing pulses are in use from angle estimates developed by phases that are displaced other than 180 electrical degrees. In this way, the absolute angle estimate is free of the above-noted ambiguity.

These and other objects, advantages and novel features of the present invention will become apparent to those skilled in the art from the drawings and following detailed description.

DESCRIPTION OF THE PREFERRED EMBODIMENTS

Figure 1:
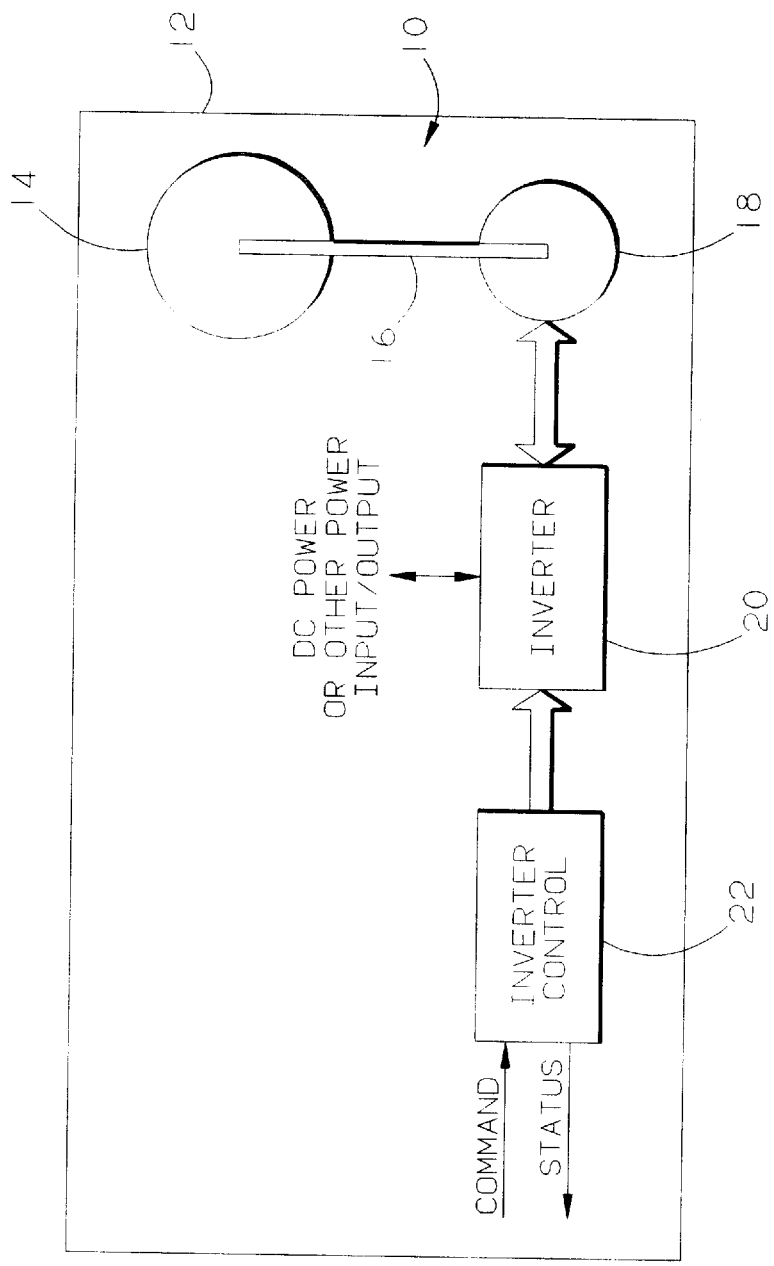
FIG. 1 comprises a block diagram of a starting/generating system for an aircraft.

Referring first to FIG. 1, a power conversion system 10 is provided on-board an aircraft (shown diagrammatically at 12) or other aerospace, land or water vehicle and includes a prime mover, for example, a gas turbine engine 14, which is coupled by a motive power shaft 16 to a switched reluctance machine 18. The machine 18 includes phase windings which are coupled to an inverter 20 operated by an inverter control 22. In a starting mode of operation, DC power is supplied to the inverter 20 and the inverter control 22 develops control signals for switches in the inverter 20 to cause the switched reluctance machine 18 to operate as a motor and supply motive power via the shaft 16 to the jet engine 14 for starting purposes. During operation in a generating mode, motive power is supplied by the gas turbine engine to the switched reluctance machine 18 via the shaft 16 and the resulting electrical power developed by the switched reluctance machine 18 is converted by the inverter 20 into DC power for one or more loads. If necessary or desirable, the inverter 20 could be modified to develop constant-frequency AC power for one or more AC loads.

Figure 2:
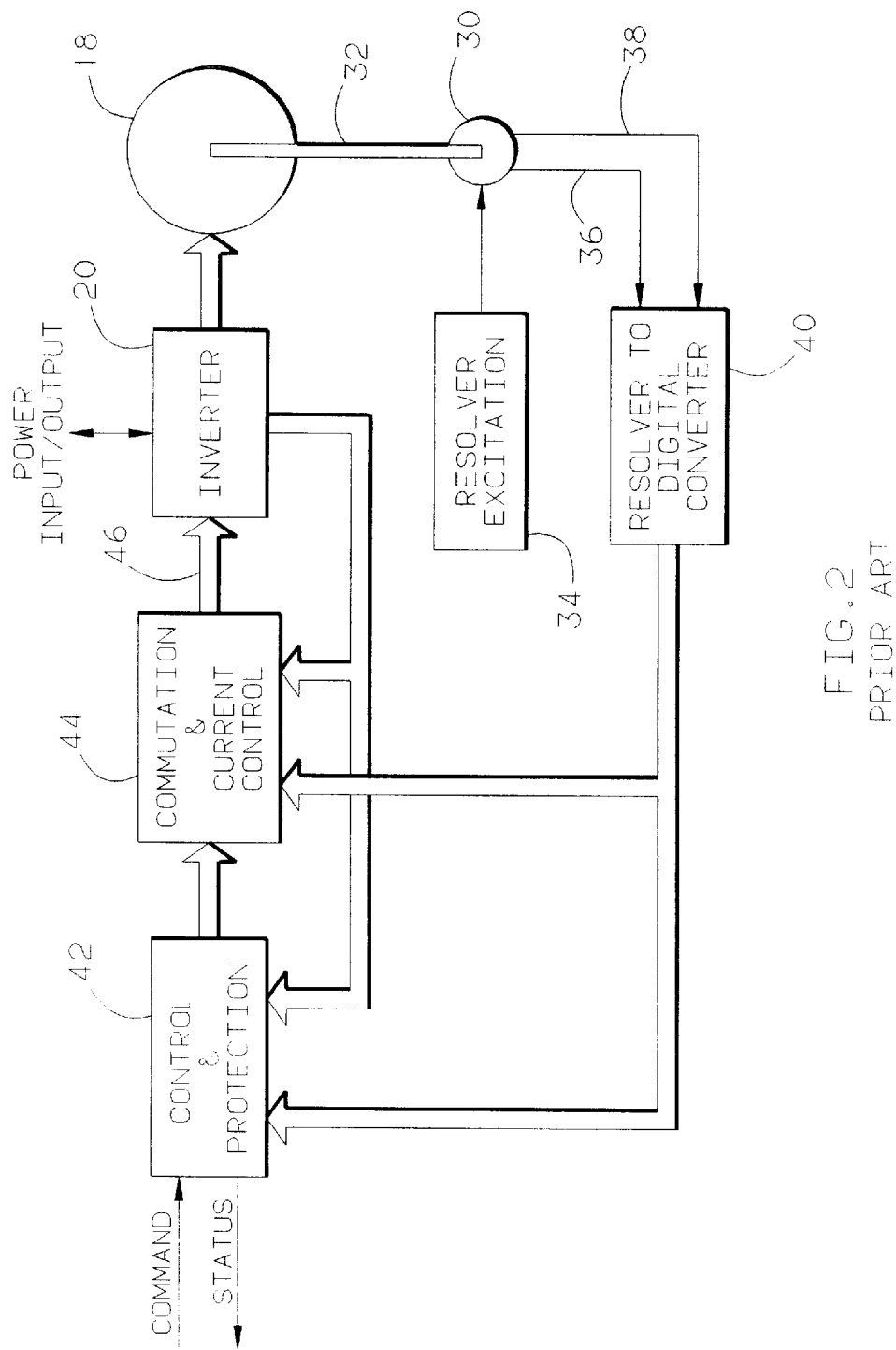
FIG. 2 comprises a block diagram of a prior art inverter control, inverter and switched reluctance machine.

Referring now to FIG. 2, a prior art inverter control for operating the switched reluctance machine 18 includes a resolver 30, which is coupled by a motive power shaft 32 to the rotor of the switched reluctance machine 18. Excitation is provided by a resolver excitation circuit 34. The resolver 30 develops first and second signals over lines 36, 38 that have a phase quadrature relationship (also referred to as sine and cosine signals). A resolver-to-digital converter 40 is responsive to the magnitudes of the signals on the lines 36 and 38 and develops a digital output representing the position of the rotor of the switched reluctance machine 18. The position signals are supplied along with a signal representing machine rotor velocity to a control and protection circuit 42. The rotor position signals are also supplied to a commutation and current control circuit 44 having an input coupled to an output of the control and protection circuit 42.

The circuits 42 and 44 further receive phase current magnitude signals as developed by the inverter 20. The circuits 42 and 44 develop switch drive signals on lines 46 for the inverter 20 so that the phase currents flowing in the windings of the switched reluctance machine 18 are properly commutated.

As noted previously, the resolver 30 is expensive and inherently a source of single point failure. Further, the resolver-to-digital converter 40 is also an expensive component and, hence, it is desirable to eliminate these and other components (including the excitation circuit 34), if possible.

Figure 3:
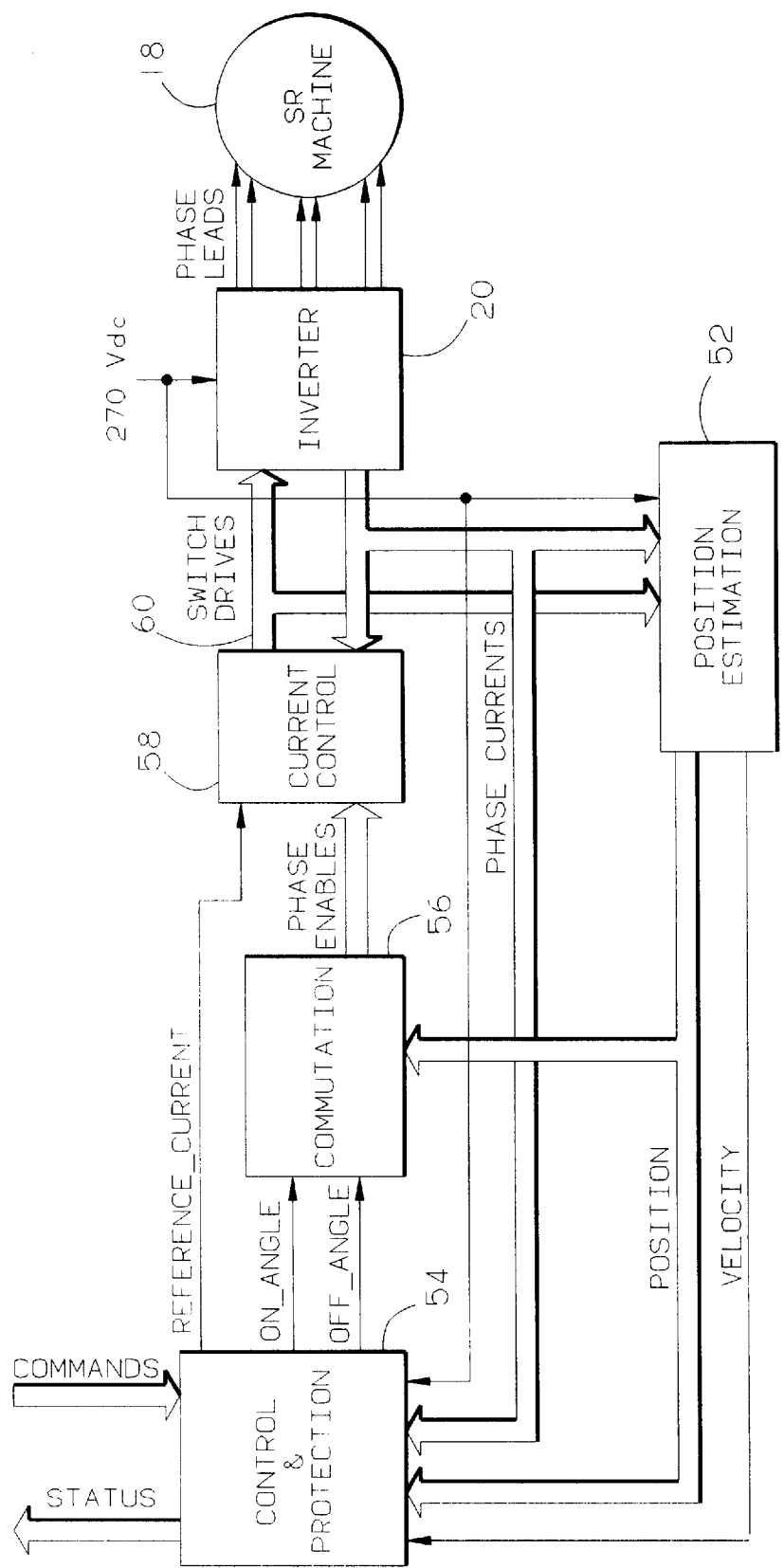
FIG. 3 comprises a block diagram of an inverter control including a current control together with an inverter and a switched reluctance machine according to the present invention.

FIG. 3 illustrates an inverter control 50 that incorporates the present invention together with the inverter 20 and the switched reluctance machine 18. A position estimation circuit 52 is responsive to the phase current magnitudes developed by the inverter 20, switch control or drive signals for switches in the inverter 20 and DC bus voltage magnitude to develop position and velocity estimate signals for a control and protection circuit 54. In addition, the position estimate signals are supplied to a commutation circuit 56. A current control circuit 58 is responsive to the phase current magnitudes developed by the inverter 20, as well as phase enable output signals developed by the commutation circuit 56 and a reference current signal developed by the control and protection circuit 54. The current control circuit 58 produces the switch control or drive signals on lines 60 for the inverter 20.

Figure 4:
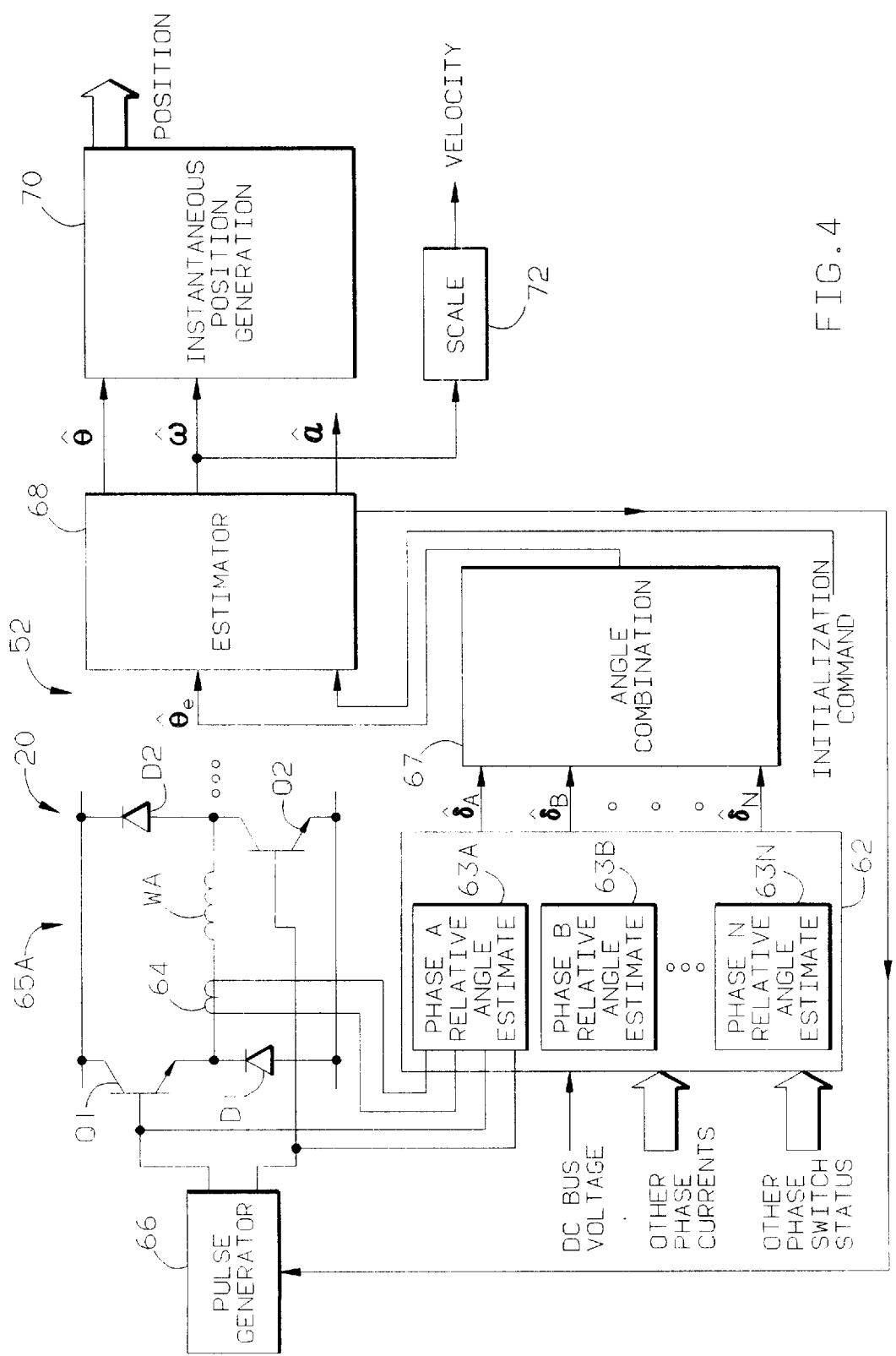
FIG. 4 comprises a block diagram of a portion of the inverter of FIG. 3 together with the position estimation circuit of FIG. 3.

FIG. 4 illustrates the position estimation circuit 52 in greater detail. A relative angle estimation logic circuit 62 includes N individual phase relative angle estimate circuits 63A, 63B, . . . 63N, each of which is associated with one of the N phases of the switched reluctance machine 18. Specifically, the phase relative angle estimate circuit 63A is associated with phase A of the machine 18 and receives a current magnitude signal developed by a current sensor 64 adapted to sense the current flowing in a phase A winding WA of the machine 18. The winding WA is connected in the phase A leg 65A of the inverter 20 having a pair of diodes D1 and D2 and a pair of controllable power switches Q1 and Q2. During initialization, the switches Q1 and Q2 receive switch control signals or sensing pulses from a pulse generator 66, and thereafter receive the control signals on the lines 60 from the current control circuit 58 of FIG. 3. Furthermore, during initialization, the phase relative angle estimate circuit 63A also receives the switch control signals and thereafter receives the control signals on the lines 60 from the circuit 58. Also during initialization, and subsequently, during operation of the circuitry of FIGS. 3 and 4 to control the machine 18, the circuit 63A develops a signal $\hat{\delta}_A$, representing an estimate of instantaneous angle from rotor/stator alignment for phase A of the machine. Similarly, each of the remaining phase relative angle estimate circuits 63B, . . . , 63N is responsive to an associated phase current magnitude signal and is further responsive to switch control signals or sensing pulses either identical to the signals (during initialization) or control signals developed by the circuit 58 (after initialization) for switches in the associated inverter phase. Each circuit 63B, . . . , 63N develops a signal $\hat{\delta}_B, \ldots, \hat{\delta}_N$, respectively, representing an estimate of instantaneous angle from rotor/stator alignment for the associated phase of the machine, both during initialization and thereafter.

Each angle estimate signal $\hat{\delta}_A, \hat{\delta}_B, \ldots, \hat{\delta}_N$, represents two possible solutions for estimated rotor position, either phase advanced with respect to (i.e., moving toward) the respective phase pole or phase delayed with respect to (i.e., moving away from) the respective phase pole. This ambiguity is removed by an angle combination circuit 67 which combines the signals $\hat{\delta}_A, \hat{\delta}_B, \ldots, \hat{\delta}_N$, to obtain an absolute angle estimate $\hat{\theta}_e$. The angle estimate $\hat{\theta}_e$ is provided to an estimator 68, preferably including a Kalman filter, which improves the estimate of rotor position to obtain a value $\hat{\theta}$. In addition, the estimator 68 develops a velocity estimate $\hat{\omega}$ and further develops an estimated acceleration signal $\hat{\alpha}$ representing the estimated acceleration of the machine rotor. The acceleration signal $\hat{\alpha}$ may be used by other circuits (not shown). The signals $\hat{\theta}$ and $\hat{\omega}$ are supplied to an instantaneous position generation circuit 70 which converts the coarse sampled output of the Kalman filter into a signal having position update intervals which are sufficiently fine to properly control commutation.

The signal $\hat{\omega}$ is further supplied to a scaling circuit 72, which in turn develops a velocity estimate signal in the correct units (e.g., rpm's) for the control and protection circuit 54 of FIG. 3.

The estimator 68 further receives an initialization command signal and develops a trigger signal for the pulse generator 66 in the fashion noted in greater detail hereinafter.

At start up of the system of FIG. 3, an initialization period is begun during which control signals or pulses are supplied to the switches Q1 and Q2. Identical control signals or pulses are simultaneously provided to the switches in the remaining phases of the inverter 20. The control signals or pulses repetitively turn on and turn off all of the switches in the inverter 20 a certain number of times during the initialization period. The inverter switches are operated together such that they are rendered conductive at the same time and are turned off at the same time. The widths of the control signals or pulses are such that the phase current magnitudes do not become excessive and such that each phase current magnitude decays to zero before application of the next pulse. During the initialization period, the relative angle estimation logic circuit 62 develops the angle estimate signals which are supplied to the angle combination circuit 67.

Figure 5:
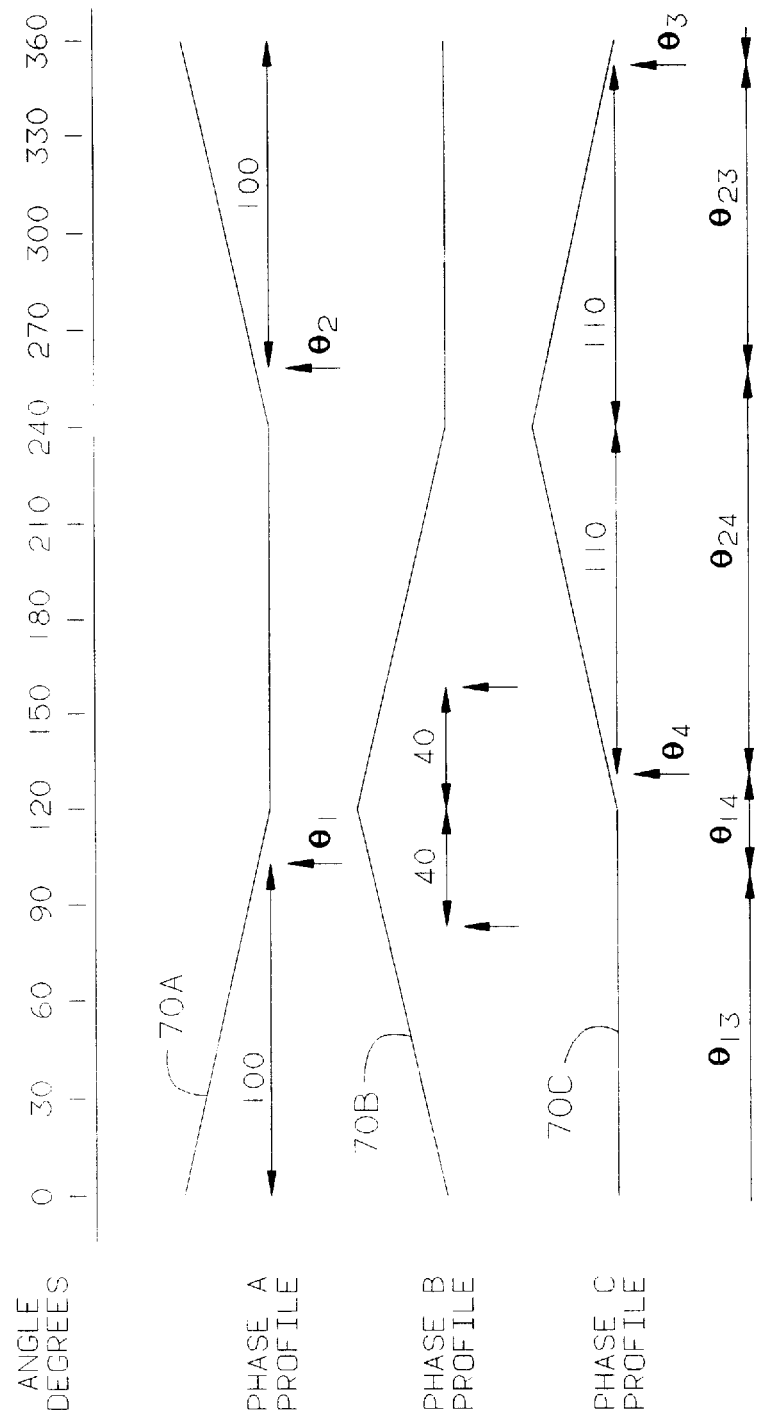
FIG. 5 comprises a series of waveform diagrams illustrating phase profiles of an electrical parameter of a three-phase switched reluctance machine.

FIG. 5 illustrates an electrical parameter, such as idealized phase inductance, which varies for the phases of the machine 18 according to three phase profiles 70A, 70B and 70C. In the example of FIG. 5, assume that $\hat{\delta}_A$, $\hat{\delta}_B$, and $\hat{\delta}_C$, are respectively equal to 100°, 40° and 110°. In the example of FIG. 5, the estimate having the highest reliability is the one is closest to 90° with respect to the maximum in the respective phase profile, and hence the estimate of highest reliability is that from phase A while the estimate having the next highest reliability is that obtained from phase C. Accordingly, phase A is considered to be the primary phase and phase C is considered to be the secondary phase. The angle combination circuit 67 calculates four values $\hat{\theta}_1$ through $\hat{\theta}_4$ as follows:

$$\hat{\theta}_1 = \theta_{PRI} + \hat{\delta}_{PRI} \text{ modulo } [0° \text{ TO } 360°] \tag{3}$$

$$\hat{\theta}_2 = \theta_{PRI} - \hat{\delta}_{PRI} \text{ modulo } [0° \text{ TO } 360°] \tag{4}$$

$$\hat{\theta}_3 = \theta_{SEC} + \hat{\delta}_{SEC} \text{ modulo } [0° \text{ TO } 360°] \tag{5}$$

$$\hat{\theta}_4 = \theta_{SEC} - \hat{\delta}_{SEC} \text{ modulo } [0° \text{ TO } 360°] \tag{6}$$

where: "modulo [0° TO 360°]" denotes the modulo function which constrains the result to a range between 0° and 360°;

$\theta_{PRI}$=phase displacement of primary phase relative to phase A; and $\theta_{SEC}$=phase displacement of secondary phase relative to phase A.

$\hat{\delta}_{PRI}$=angle estimate developed by the primary phase.

$\hat{\delta}_{SEC}$=angle estimate developed by the secondary phase.

Thus, utilizing the foregoing values in equations (3)–(6), values $\hat{\theta}_1$ through $\hat{\theta}_4$ are calculated as follows:

$$\hat{\theta}_1 = \text{modulo } [0° \text{ TO } 360°] \, (0°+100°) = 100° \tag{7}$$

$$\hat{\theta}_2 = \text{modulo } [0° \text{ TO } 360°] \, (0°-100°) = 260° \tag{8}$$

$$\hat{\theta}_3 = \text{modulo } [0° \text{ TO } 360°] \, (240°+110°) = 350° \tag{9}$$

$$\hat{\theta}_4 = \text{modulo } [0° \text{ TO } 360°] \, (240°-110°) = 130° \tag{10}$$

Next, a series of values representing differences between the angles $\hat{\theta}_1 - \hat{\theta}_4$ are calculated by the circuit 67 as follows:

$$\hat{\theta}_{13} = \text{abs } (\text{modulo } [-180° \text{ TO } +180°] \, (\hat{\theta}_1 - \hat{\theta}_3)) \tag{11}$$

$$\hat{\theta}_{14} = \text{abs } (\text{modulo } [-180° \text{ TO } +180°] \, (\hat{\theta}_1 - \hat{\theta}_4)) \tag{12}$$

$$\hat{\theta}_{23} = \text{abs } (\text{modulo } [-180° \text{ TO } +180°] \, (\hat{\theta}_2 - \hat{\theta}_3)) \tag{13}$$

$$\hat{\theta}_{24} = \text{abs } (\text{modulo } [-180° \text{ TO } +180°] \, (\hat{\theta}_2 - \hat{\theta}_4)) \tag{14}$$

where "abs" denotes the absolute value function and "modulo [−180° TO +180°]" denotes the modulo function which constrains the result to a range between −180° and +180°.

The values $\hat{\theta}_{13}$, $\hat{\theta}_{14}$, $\hat{\theta}_{23}$ and $\hat{\theta}_{24}$ are then compared by the angle combination circuit 67 to determine the angle estimate $\hat{\theta}_e$. Specifically, if either $\hat{\theta}_{13}$ or $\hat{\theta}_{14}$ is less than both $\hat{\theta}_{23}$ and $\hat{\theta}_{24}$ then $\hat{\theta}_e$ is equal to $\hat{\theta}_1$. Otherwise $\hat{\theta}_e$ equals $\hat{\theta}_2$. In the foregoing example, $\hat{\theta}_{14}$ (equal to 30°) is less than both $\hat{\theta}_{23}$ and $\hat{\theta}_{24}$ (equal to 90° and 130°, respectively), and hence $\hat{\theta}_e$ equals $\hat{\theta}_1$ or 100°.

Figure 6:
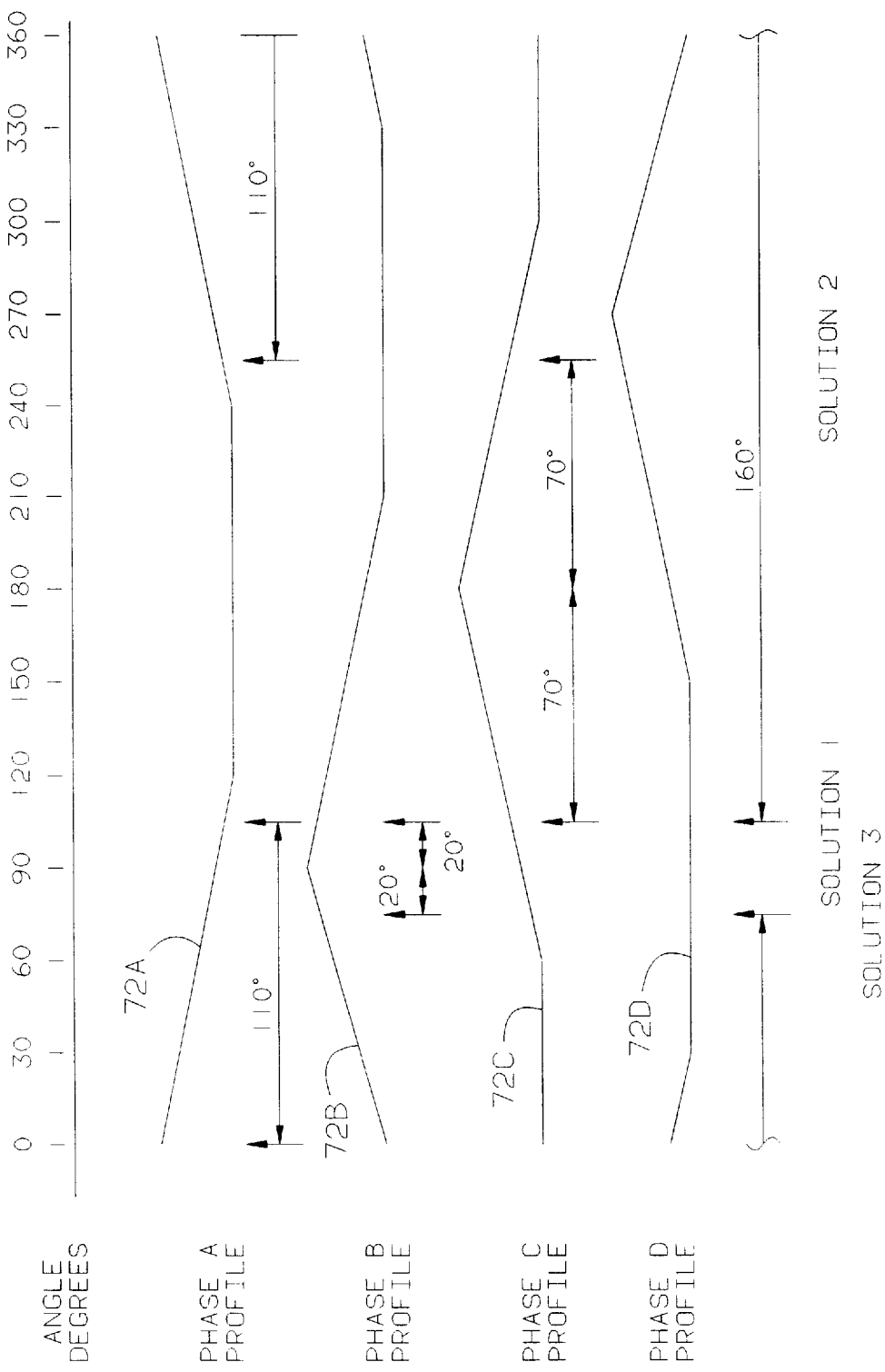
FIG. 6 comprises a series of waveform diagrams similar to FIG. 5 for a four-phase switched reluctance machine.

While the foregoing methodology to determine $\hat{\theta}_e$ is effective in the case where the switched reluctance machine 18 includes an odd number of poles, it has been found that when the switched reluctance machine 18 includes an even number of poles, an ambiguity can arise in the determination of the angle $\hat{\theta}_e$. FIG. 6 illustrates phase profiles 72A–72D for a four-phase switched reluctance machine 18. In this case, (and in the case of every switched reluctance machine having an even number of phases) the machine symmetry results in a possible ambiguity in the estimation of rotor position. In the example of FIG. 6, where the angle estimate for phase A is 110° and the angle estimate for phase C is 70° and the angle estimates for phases B and D are 20° and 160°, respectively, the angle estimates for phases A and C are closer to 90° than the angle estimates for phases B and D, and hence one of phases A and C should be selected as the primary phase. However, if phase A is selected as the primary phase and phase C is selected as the secondary phase there are two possible solutions in the estimation of the $\hat{\theta}_e$, either 250° or 110°. Likewise, if phase C is selected as the primary phase and phase A is selected as the secondary phase there are again two possible solutions. Similarly, if one were to select phase B as the primary phase and phase D as the secondary phase, or if phase D were selected as the primary phase and phase B as the secondary phase, there remain two possible solutions.

Figure 7A:
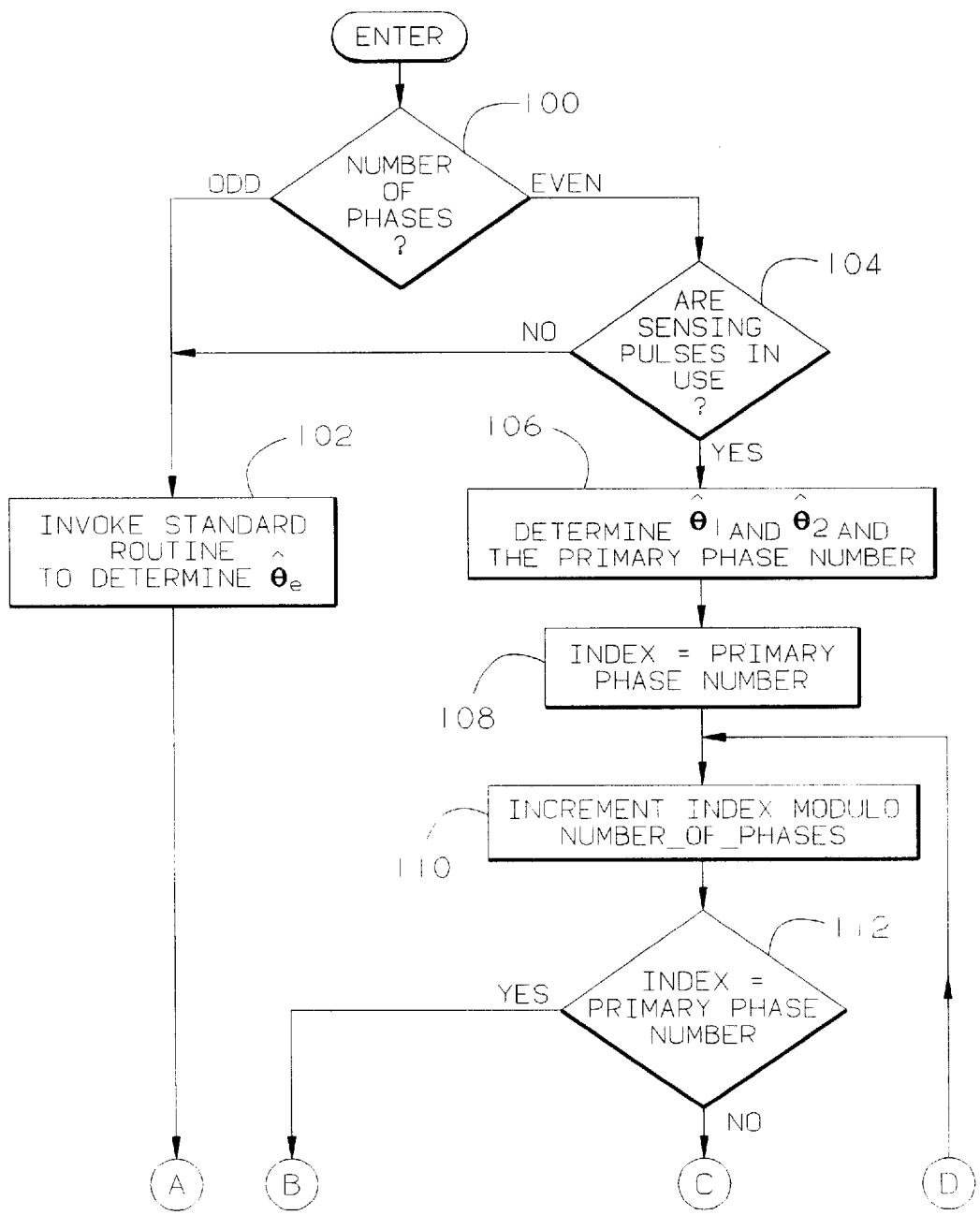
FIGS. 7A and 7B, when joined at the similarly-lettered lines, together comprise a flowchart illustrating programming executed by the angle combination circuit of FIG. 4 to implement the present invention.
Figure 7B:
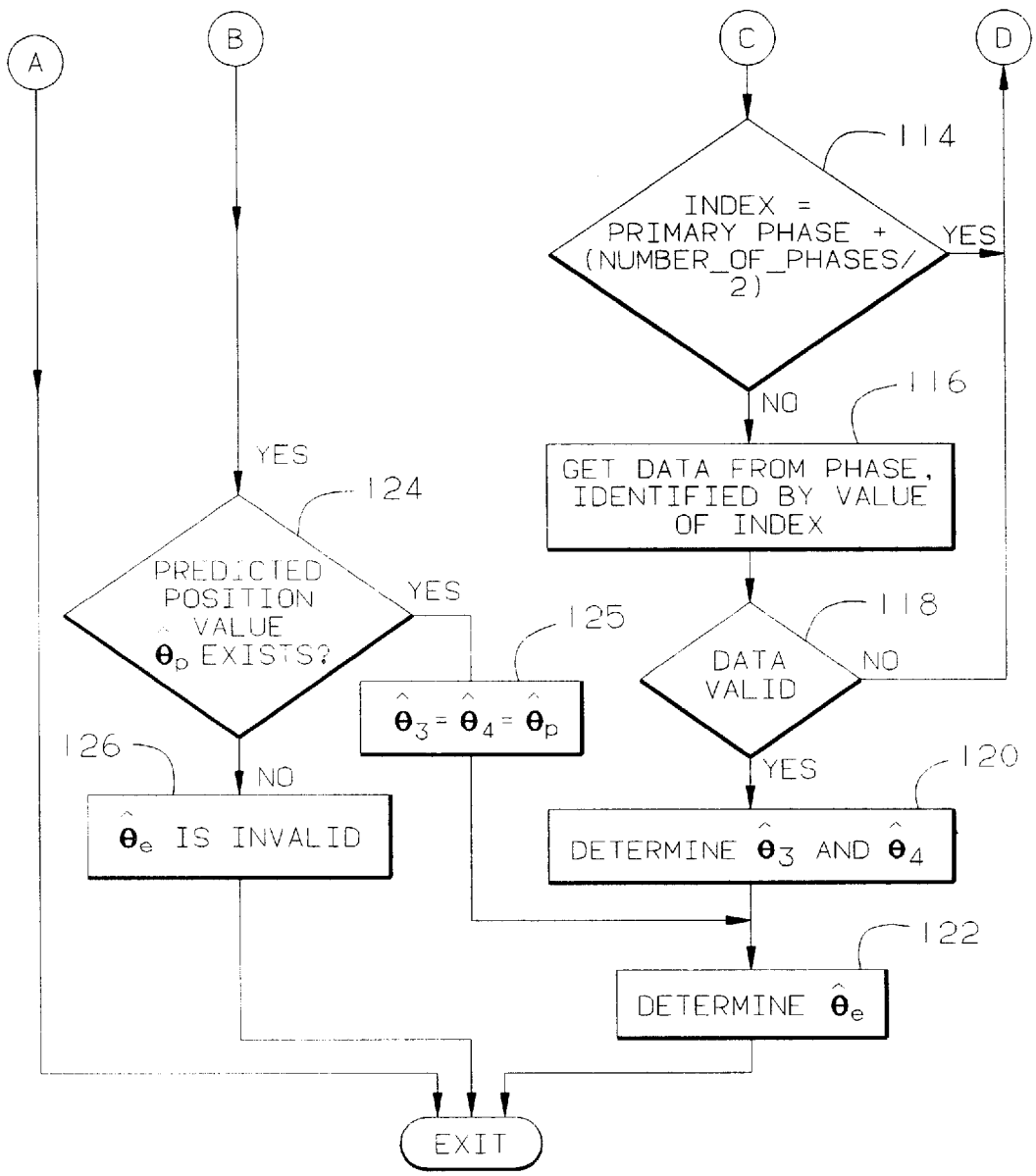

In order to remove this ambiguity, the present invention selects phases which are displaced at electrical angles other than 180° as the primary and secondary phases. The flowchart of FIGS. 7A and 7B illustrates programming that may be executed by the angle combination circuit 67 of FIG. 4 to undertake this function. Referring specifically to FIG. 7A, the programming begins at a block 100 which checks to determine the number of phases of the switched reluctance machine. If the number of phases is odd, a block 102 invokes a routine to determine $\hat{\theta}_e$ in accordance with the equations (3)–(6) and (11)–(14) presented above together with the methodology described in connection therewith. Control then exits the routine that determines $\hat{\theta}_e$.

If the block 100 determines that the switched reluctance machine 100 has an even number of phases, a block 104 checks to determine whether the system of FIG. 4 is being initialized, i.e., whether sensing pulses are being applied to the phase windings WA–WN of the switched reluctance machine 18. If this is not the case, control passes to the block 102 which includes programming to determine the value $\hat{\theta}_e$ when sensing pulses are not in use. Otherwise, control passes to a block 106.

The block 106 determines which phase has the highest reliability angle estimate and calculates the values $\hat{\theta}_1$ and $\hat{\theta}_2$ according to equations (3) and (4) above. In this case, either the phase A or phase C estimate could be selected as the primary phase. When either of two phases could be selected as the primary phase, an arbitrary assignment of one of such phases as the primary phase is made. As an example, assume that the block 106 selects phase C in the example of FIG. 6 as the primary phase. The block 106 further determines the phase number of the primary phase according to a numbering scheme that assigns phase A as phase No. 1, phase B as phase No. 2, and so on. Thus, the block 106 ascertains that the primary phase is phase No. 3. A block 108 sets a variable INDEX equal to the primary phase number (in this case 3) and a block 110 increments the value of INDEX by 1 according to a modulo function having limits equal to the number of phases. That is the block 110 increments INDEX according to the sequence, 1, 2, 3, 4, 1, 2, . . .

Following the block 110, a block 112 checks to determine whether the value of INDEX is currently equal to the primary phase number. In the first pass through the program, INDEX is currently equal to 4, and hence control passes to a block 114, FIG. 7B, which checks to determine whether the value of INDEX is equal to the primary phase number plus the number of total phases of the switched reluctance machine divided by 2 taken modulo over the number of phases. In effect, the block 114 checks to determine whether the value of INDEX is currently indicating a phase which is 180 electrical degrees displaced from the primary phase. If this is found to be the case, control returns to the block 110 where the value of INDEX is incremented by 1. Otherwise, the angle estimates from the phase indicated by the current value of INDEX are obtained by a block 116. Thus, for example, during the first pass through the program of FIG. 7 in the example of FIG. 6, data representing the angle estimates from phase D may be obtained by the block 116. Following the block 116, a block 118 checks the data obtained by the block 116 in accordance with one or more validity criteria to determine whether such data are considered to be valid. Such criteria may include, for example, a determination of whether the phase angle estimate is less than or equal to a particular phase displacement (such as 180°) from the maximum in the phase profile and/or whether the current magnitude in the respective phase winding is above a certain threshold. If the block 118 determines that the data from the phase identified by the current value of INDEX are not valid (for example, where one or both of the foregoing validity criteria are not satisfied), control returns to the block 110 where INDEX is incremented by 1. Otherwise, a determination has been made that the angle estimates of the phase identified by the current value of the variable INDEX are to be utilized to calculate the values $\hat{\theta}_3$ and $\hat{\theta}_4$ in accordance with the equations (5) and (6) above. In other words, the phase identified by the current value of INDEX is selected as the secondary phase.

Following the block 120, a block 122 utilizes the equations (7)–(14) and the methodology described above to determine the value of $\hat{\theta}_e$ using the values of $\hat{\theta}_1$, $\hat{\theta}_2$, $\hat{\theta}_3$ and $\hat{\theta}_4$ as calculated by the blocks 106 and 120. Thereafter, control exits the routine of FIG. 7.

As should be evident from the foregoing, the programming of FIG. 7 sequentially checks each of the phases to determine whether a secondary phase can be identified which is displaced at an angle other than 180° with respect to the primary phase and which returns valid data identifying the phase angle estimate thereof. If none of the phases other than the primary phase can be so identified, then control passes from the block 112 to a block 124 which checks to determine whether a predicted rotor position value should be utilized in place of a calculated value for $\hat{\theta}_e$. This predicted value can be developed based upon one or more past estimates of $\hat{\theta}_e$ or may be developed in any other fashion. If a predicted position value is to be used, control passes to a block 125 which sets the values of $\theta_3$ and $\theta_4$ equal to the predicted position value, and thence to the block 122. On the other hand, if a predicted position value is not available, control passes to a block 126 which develops and stores an indication that $\hat{\theta}_e$ cannot be determined and is thus invalid.

Control from the block 126 then exits the routine of FIG. 7.

During normal operation of a switched reluctance machine having an even number of poles, i.e., when the control for such a machine is not being initialized so that sensing pulses are not in use, if it is possible that data from phases displaced 180 electrical degrees relative to one another could be used, the programming of blocks 106–126 could be used to prevent such possibility leading to an ambiguous position indication.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. Apparatus for estimating rotor position of a rotating machine having N phase windings where N is an even number greater than or equal to four, wherein each phase winding exhibits an electrical parameter that varies according to an associated phase profile and the phase profile are displaced 360/N electrical degrees relative to one another and wherein the apparatus is responsive to phase position estimates developed in response to pulses applied to the phase windings, comprising:

means for selecting first and second phase position estimates in accordance with a reliability criterion wherein the first and second phase position estimates are developed in response to pulses applied to phase windings having associated phase profiles that are displaced at other than 180 electrical degrees; and means coupled to the selecting means for determining a rotor position estimate from the first and second phase position estimates.

2. The apparatus of claim 1, wherein the selecting means includes means for ascertaining which of the phase position estimates satisfies the reliability criterion.

3. The apparatus of claim 1, wherein the selecting means includes first means for designating the phase position estimate having a highest reliability as the first phase position estimate and second means for designating a further phase position estimate as the second phase position estimate.

4. Apparatus for estimating rotor position of a rotating machine having N phase windings where N is an even number greater than or equal to four, wherein each phase winding exhibits an electrical parameter that varies according to an associated phase profile and the phase profiles are displaced 360/N electrical degrees relative to one another and wherein the apparatus is responsive to phase position estimates developed in response to pulses applied to the phase windings, comprising:

means for selecting first and second phase position estimates in accordance with a selection criterion wherein the first and second phase position estimates are developed in response to pulses applied to phase windings having associated phase profiles that are displaced at other than 180 electrical degrees; and means coupled to the selecting means for determining a rotor position estimate from the first and second phase position estimates wherein the first phase position estimate comprises first and second angles $\hat{\theta}_1$ and $\hat{\theta}_2$ and the second phase position estimate comprises third and fourth angles $\hat{\theta}_3$ and $\hat{\theta}_4$ and wherein the determining means includes means for calculating values $\hat{\theta}_{13}$, $\hat{\theta}_{14}$, $\hat{\theta}_{23}$, $\hat{\theta}_{24}$ as follows:

$\hat{\theta}_{13}$=abs (modulo [−180° TO +180°] ($\hat{\theta}_1 - \hat{\theta}_3$))
    $\hat{\theta}_{14}$=abs (modulo [−180° TO +180°] ($\hat{\theta}_1 - \hat{\theta}_4$))
    $\hat{\theta}_{23}$=abs (modulo [−180° TO +180°] ($\hat{\theta}_2 - \hat{\theta}_3$))
    $\hat{\theta}_{24}$=abs (modulo [−180° TO +180°] ($\hat{\theta}_2 - \hat{\theta}_4$))

and means responsive to the calculating means for comparing the values $\hat{\theta}_{13}$, $\hat{\theta}_{14}$, $\hat{\theta}_{23}$, $\hat{\theta}_{24}$ to determine the rotor position estimate.

5. The apparatus of claim 4, wherein the comparing means comprises means for setting the rotor position estimate equal to $\hat{\theta}_1$ if either or both of the values $\hat{\theta}_{13}$ and $\hat{\theta}_{14}$ is less than both of the values $\hat{\theta}_{23}$ and $\hat{\theta}_{24}$.

6. The apparatus of claim 4, wherein the comparing means comprises means for setting the rotor position estimate equal to $\hat{\theta}_2$ by if neither of the values $\hat{\theta}_{13}$ and $\hat{\theta}_{14}$ is less than both of the values $\hat{\theta}_{23}$ and $\hat{\theta}_{24}$.

7. Apparatus for estimating rotor position of a switched reluctance machine having N phase windings where N is an even number greater than or equal to four, wherein each phase winding has an inductance that varies according to an associated phase inductance profile and the phase inductance profiles are displaced 360/N electrical degrees relative to one another and wherein the apparatus is responsive to phase position estimates developed in response to pulses applied to the phase windings, comprising:

first means for selecting a first phase position estimate in accordance with a reliability criterion;

second means for selecting a second phase position estimate;

wherein the first and second phase position estimates are developed in response to pulses applied to phase windings having associated phase inductance profiles that are displaced at other than 180 electrical degrees; and means coupled to the selecting means for determining a rotor position estimate from the first and second phase position estimates.

8. The apparatus of claim 7, wherein the first selecting means includes means for designating the phase position estimate having a highest reliability as the first phase position estimate.

9. The apparatus of claim 8, wherein the first phase position estimate comprises first and second angles $\hat{\theta}_1$ and $\hat{\theta}_2$ and the second phase position estimate comprises third and fourth angles $\hat{\theta}_3$ and $\hat{\theta}_4$ and wherein the determining means includes means for calculating values $\hat{\theta}_{13}$, $\hat{\theta}_{14}$, $\hat{\theta}_{23}$, $\hat{\theta}_{24}$ as follows:

$\hat{\theta}_{13}$=abs (modulo [−180° TO +180°] ($\hat{\theta}_1 - \hat{\theta}_3$))
    $\hat{\theta}_{14}$=abs (modulo [−180° TO +180°] ($\hat{\theta}_1 - \hat{\theta}_4$))
    $\hat{\theta}_{23}$=abs (modulo [−180° TO +180°] ($\hat{\theta}_2 - \hat{\theta}_3$))
    $\hat{\theta}_{24}$=abs (modulo [−180° TO +180°] ($\hat{\theta}_2 - \hat{\theta}_4$))

and means responsive to the calculating means for comparing the values $\hat{\theta}_{13}$, $\hat{\theta}_{14}$, $\hat{\theta}_{23}$, $\hat{\theta}_{24}$ to determine the rotor position estimate.

10. The apparatus of claim 9, wherein the comparing means comprises means for setting the rotor position estimate equal to $\hat{\theta}_1$ if either or both of the values $\hat{\theta}_{13}$ and $\hat{\theta}_{14}$ is less than both of the values $\hat{\theta}_{23}$ and $\hat{\theta}_{24}$.

11. The apparatus of claim 10, wherein the comparing means further comprises means for establishing the rotor position estimate equal to $\hat{\theta}_2$ if neither of the values $\hat{\theta}_{13}$ and $\hat{\theta}_{14}$ is less than both of the values $\hat{\theta}_{23}$ and $\hat{\theta}_{24}$.

* * * * *